US009864202B1

(12) United States Patent
Wallen

(10) Patent No.: US 9,864,202 B1
(45) Date of Patent: Jan. 9, 2018

(54) COLLAPSIBLE VIRTUAL REALITY VIEWER ASSEMBLY

(71) Applicant: HALLMARK CARDS, INCORPORATED, Kansas City, MO (US)

(72) Inventor: Thomas A. Wallen, Merriam, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 15/196,205

(22) Filed: Jun. 29, 2016

(51) Int. Cl.
| | | |
|---|---|---|
| *G02B 23/00* | (2006.01) | |
| *G02B 27/02* | (2006.01) | |
| *G06T 19/00* | (2011.01) | |
| *G02B 27/22* | (2006.01) | |
| *G02B 23/20* | (2006.01) | |
| *G02B 27/04* | (2006.01) | |

(52) U.S. Cl.
CPC ........... *G02B 27/022* (2013.01); *G02B 23/20* (2013.01); *G02B 27/04* (2013.01); *G02B 27/2257* (2013.01); *G06T 19/006* (2013.01)

(58) Field of Classification Search
CPC . G02B 23/20; G02B 27/04; G02B 27/272257
USPC ...................... 359/408, 409, 474; 40/124.09, 40/124.11–124.14, 365, 610
See application file for complete search history.

(56) References Cited

U.S. PATENT DOCUMENTS

| | | | | |
|---|---|---|---|---|
| 2,789,460 | A | | 4/1957 | Kaufman |
| 4,242,818 | A | * | 1/1981 | Carver ................... G02B 27/04 40/364 |
| 4,357,073 | A | * | 11/1982 | Carver ................... G02B 23/18 352/239 |
| 9,189,977 | B2 | | 11/2015 | Mayer et al. |

(Continued)

FOREIGN PATENT DOCUMENTS

| | | | | |
|---|---|---|---|---|
| EP | 1 932 572 A1 | * | 6/2008 | ............. G02B 27/22 |
| FR | 2715234 A1 | | 7/1995 | |

OTHER PUBLICATIONS

Printing Impressions, Market Watch, "Quad/Graphics Goes Virtual to Bring Sports Illustrated's Swimsuit Issue to Life" published Feb. 18, 2016, http://www.piworld.com/article/quad-goes-virtual-to-bring-sis-swimsuit-issue-to-life/, 5 pages.
Structural Graphics, SleekPeeks™ Virtual Reality Viewer, http://www.structuralgraphics.com/work/technology/virtual-reality-headsets/sleek-peeks-virtual-reality-glasses, retrieved Apr. 19, 2016, 3 pages.

(Continued)

*Primary Examiner* — Audrey Y Chang
(74) *Attorney, Agent, or Firm* — Shook, Hardy & Bacon L.L.P.

(57) ABSTRACT

The present invention relates to a collapsible virtual reality viewer. Aspects of the viewer include a body portion and a viewing portion, each having a plurality of panels abutting fold lines. The viewer may be folded along the fold lines to move from an expanded configuration to a collapsed configuration when it is not being used. In one aspect, the viewer includes a detachable portion in which a detachable panel is removeably coupled to the viewer along a plurality of perforations. Promotional material may be printed on or attached to the detachable panel. In another embodiment, the (Continued)

viewer is of a unitary construction in which the panels of the body portion and the panels of the viewing portion are die cut from a single piece of material and folded along fold lines to form the viewer.

20 Claims, 9 Drawing Sheets

(56) References Cited

U.S. PATENT DOCUMENTS

2013/0036635 A1    2/2013   Mayer et al.

OTHER PUBLICATIONS

DODOcase, P2 Virtual Reality Cardboard Pop-Up Viewer, published at least as early as Jan. 11, 2016 and last retrieved Oct. 4, 2016, http://www.dodocase.com/products/p2-virtual-reality-cardboard-pop-up-viewer, 21 pages.

VRPill, Lay's Free Google Cardboard Promotion First 1000, published Sep. 1, 2015, http://www.vrpill.com/recent-news/lays-free-google-cardboard-promotion-first-1000/, 5 pages.

Pockeyes, published as early as Jan. 1, 2016, http://pockeyes.com/en, 7 pages.

Digital photographs of various views of a Hallmark greeting card marketed and sold in 2008, 6 pages.

Office Action dated Sep. 8, 2017 in Canadian Patent Application No. 2,947,047, 4 pages.

* cited by examiner

COLLAPSIBLE VIRTUAL REALITY VIEWER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention generally relates to assemblies for viewing virtual reality displays. More specifically, the present invention relates to various embodiments of a collapsible virtual reality viewer.

BACKGROUND

There are currently applications for computing devices, such as smartphones, that are designed to provide a user with a virtual reality experience. To achieve the virtual reality experience, a user may view a virtual reality display on the device through a viewer. The viewer may have a slot for the device, and a user can look through viewing holes to see the virtual reality display on the device. Because viewers may be used with smartphones, which are easily transportable, a user may also wish to have a viewer that is also easily transportable. Traditional viewers, however, require assembly by the user and are designed to remain in the assembled form. These traditional viewers tends to be bulky and do not easily slip into a user's pocket or purse for transporting. A fully collapsible viewer that does not require any assembly is needed to provide more a more transportable and easy-to-use viewer. Additionally, a fully collapsible viewer made from a single piece of material, such as a blank of cardstock, provides a cost-efficient option and can easily be mailed as a flat item. Further, it may be desirable to integrate promotional material into a collapsible virtual reality viewer.

SUMMARY

This summary is provided to introduce a selection of concepts in a simplified form that are further described below in the detailed description section. This summary is not intended to identify key or essential features of the claimed subject matter, nor is it intended to be used as an aid in determining the scope of the claimed subject matter. The scope of the invention is defined by the claims.

Embodiments of the present invention are directed to a collapsible virtual reality viewer for use with a device running an application that creates virtual reality displays. Aspects of the viewer comprise a body portion and a viewing portion. The body portion may include a first body wall having a first body panel and a second body wall opposite the first body wall and having a second body panel and a third body panel. The third body panel may be permanently secured to the second body panel. Additionally, the first body wall and the second body wall may be joined at one end by a first side wall having a first side panel and a second side panel and at another end by a second side wall having a third panel and a fourth panel. The body portion may also include a back wall having a back panel coupled to the first body panel and the third body panel.

The viewing portion of the collapsible viewer may include at least an inner viewing panel and an outer viewing panel. The inner viewing panel may have a display aperture for viewing a virtual reality display, and the outer viewing panel may have a first viewing aperture and a second viewing aperture for viewing the virtual reality display. The display aperture and the viewing apertures allow a user to look through the viewer to see the virtual reality display. The outer viewing panel may further include one or more viewing panel tabs configured to couple the outer viewing panel to the second body panel.

The collapsible virtual reality viewer may include a plurality of fold lines between various panels of the body portion and the viewing portion and may be configured to fold between a collapsed configuration and an expanded configuration. When in the expanded configuration, the viewing portion may be at least partially disposed within a cavity formed by the body portion, and the viewing portion and the body portion may form a slot configured to hold a virtual reality display device.

In another embodiment, the collapsible virtual reality viewer may be used with promotional material. This embodiment may comprise a body portion and a viewer portion as detailed above. The collapsible virtual reality viewer may also include a detachable portion comprising a detachable panel removeably coupled to the third body panel along a plurality of perforations. The detachable portion may include promotional material attached to or printed on the detachable panel. When in a collapsed configuration and prior to removal of the detachable panel, an interior surface of the detachable panel may contact an exterior surface of the second body panel such that the detachable panel lays underneath the second body panel.

In a further embodiment, the collapsible virtual reality viewer is a unitary piece in which the panels of the body portion and the panels of the viewing portion are all die cut from a single piece of material. Specifically, the body portion may comprise a first body panel, a first side panel adjacent the first body panel at a first fold line, a second side panel adjacent the first side panel at a second fold line, a second body panel adjacent the second side panel at a third fold line, a third side panel adjacent the second body panel at a fourth fold line, and a fourth side panel adjacent the first body panel at a fifth fold line. The body portion may further comprise a side tab configured to couple third side panel and the fourth side panel to complete an outer perimeter of the body portion. The body portion may also include a back panel adjacent the first body panel at a sixth fold line and a third body panel adjacent the back panel at a seventh fold line. The third body panel may be configured to be permanently secured to the second body panel.

Continuing to the viewing portion of the viewer, an inner viewing panel may be adjacent the second body panel at an eighth fold line. An intermediate viewing panel may be adjacent the inner viewing panel at a ninth fold line, and an outer viewing panel may be adjacent the intermediate viewing panel at a tenth fold line. The inner viewing panel may have a display aperture, and the outer viewing panel may include two viewing apertures for viewing a virtual reality display. The outer viewing panel may also include one or more viewing panel tabs configured to couple the outer viewing panel and the second body panel.

BRIEF DESCRIPTION OF THE SEVERAL VIEWS OF THE DRAWINGS

The present invention is explained in more detail with reference to the embodiments illustrated in the attached drawing figures, in which like reference numerals denote like elements, wherein.

DETAILED DESCRIPTION

In simplest terms, the present invention may be referred to as a "collapsible virtual reality viewer." The viewer is designed to provide an easily transportable and economically manufactured headset for virtual reality viewing using a virtual reality application on a computing device, such as a smartphone. The viewer may be used when in an expanded configuration and may be collapsed to a closed configuration when not in use. In some embodiments, the viewer also includes promotional material, such as advertisements or coupons. Further, the viewer may be a unitary structure made from a single piece of material, such as cardstock. Various embodiments of the viewer are described below.

Figure 1:
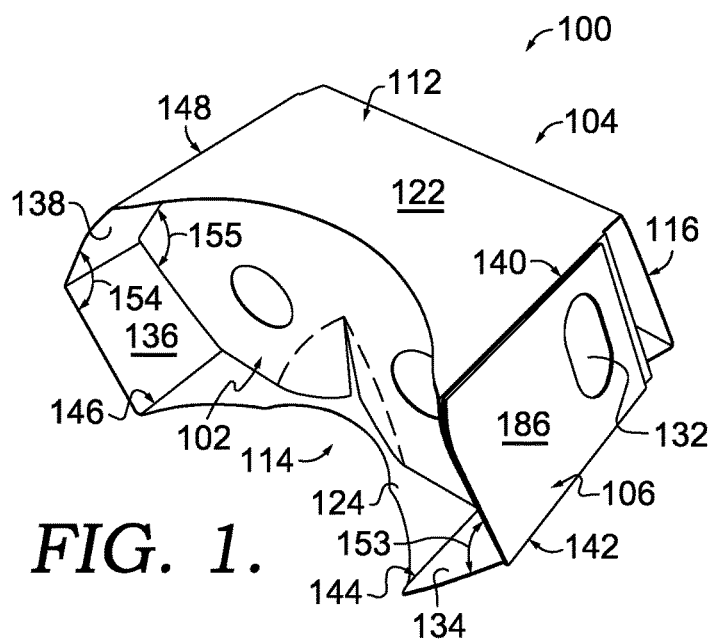
FIG. 1 depicts a front perspective view of a first embodiment of a virtual reality viewer in an expanded configuration, in accordance with an aspect of the present invention.
Figure 2:
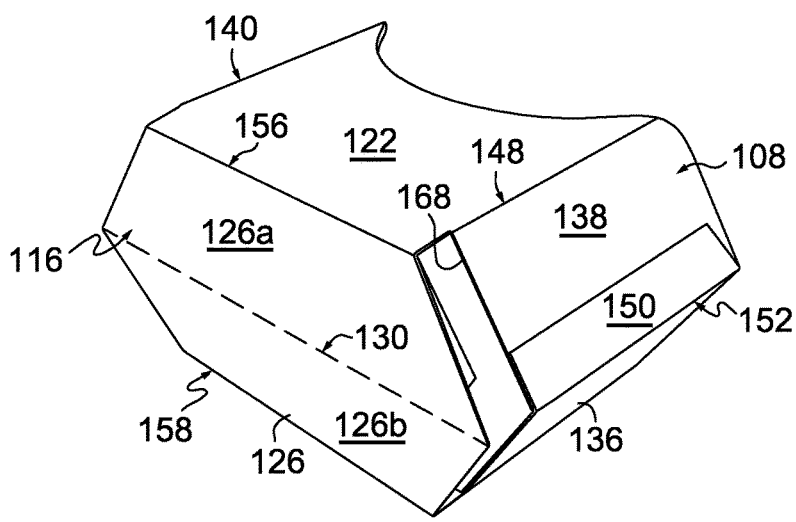
FIG. 2 depicts a rear perspective view of the viewer in an expanded configuration depicted in FIG. 1.
Figure 3:
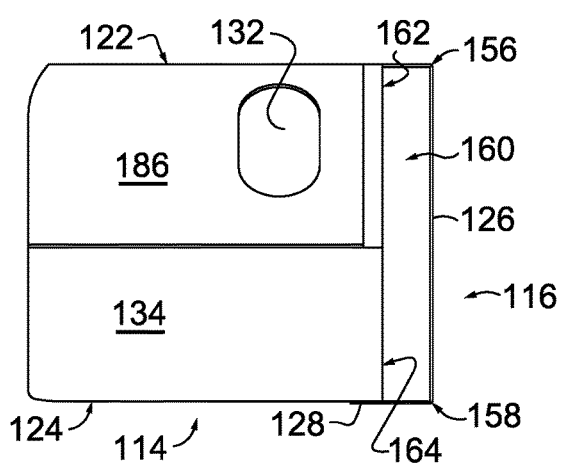
FIG. 3 depicts a side view of the viewer in an expanded configuration depicted in FIG. 1.

FIGS. 1, 2, and 3 provide a front perspective view, a rear perspective view, and a side elevation view, respectively, of a viewer 100 in an expanded configuration. In some embodiments, the viewer 100 is formed from a single piece of material that is die cut and folded to form a plurality of panels. It should be noted that the term "die cut" should be interpreted broadly to cover all types of cutting a desired shape out of a piece of material or stock (e.g. laser, scissors, pressing of dies, etc.). The material comprising the plurality of panels may be a variety of materials including plastics, natural paper, synthetic paper, and the like. In some embodiments, the panels comprise cardstock. Embodiments of the viewer 100 further comprise a plurality of fold lines between the panels that facilitate movement between the open and collapsed configurations. It should be noted that the term "fold line" as used in this disclosure should be interpreted broadly to cover all types of bends, scores, rules, creases, perforations, etc.

These panels may comprise a viewing portion 102 and a body portion 104 of the viewer 100. As illustrated in FIG. 1, the body portion 104 may at least partially enclose or surround the viewing portion 102 when the viewer 100 is in the expanded configuration. As such, the panels comprising the body portion 104 generally form the exterior of the viewer 100. Specifically, the body portion 104 may include a first body wall 112 and a second body wall 114 opposite the first body wall 112. The first body wall 112 may comprise a first body panel 122 while the second body wall 114 may comprise a second body panel 124 and a third body panel 128. The third body panel 128 may be coupled to the second body panel 124. For example, in some embodiments, at least a portion of the third body panel 128 is permanently secured to at least a portion of the second body panel 124 with a layer of adhesive. By permanently securing the third body panel 128 to the second body panel 124, the viewer 100, in a collapsed configuration, need only be expanded before it is ready for use. In this way, unnecessary assembly for the user is eliminated. It is contemplated, however, that the third body panel 128 may also be releasably coupled to the second body panel 124 with a releasable coupling mechanism such as a hook and loop fastener (e.g., Velcro®), snap-type fasteners, and the like.

The first body wall 112 and the second body wall 114 may be substantially parallel to one another. The first body wall 112 and the second body wall 114 may be joined at one end by a first side wall 106 and at an opposite end by a second side wall 108. The first side wall 106 may comprise a first side panel 132 and a second side panel 134, while the second side wall 108 may include a third side panel 136 and a fourth side panel 138. The first and second body panels 122 and 124, respectively, and the first, second, third, and fourth side panels 132, 134, 136, 138, respectively, generally form an outer perimeter of the body portion 104 of the viewer 100.

More specifically, at one end, the first side panel 132 may be adjacent the first body panel 122 at a first fold line 140 and adjacent the second side panel 134 at a second fold line 142 (sometimes described as the side panel fold line), while the second side panel 134 may be adjacent the second body panel 124 at a third fold line 144. Similarly, at the other end, the third side panel 136 may be adjacent the second body panel 124 at a fourth fold line 146 while the fourth side panel 138 may be adjacent the first body panel 122 at a fifth fold line 148. The third side panel 136 and the fourth side panel 138 may be coupled together via a side tab 150, rather than being directly coupled along a fold line. In some embodiments, the side tab 150 may abut the third side panel 136 at a side tab fold line 152 and may use a coupling mechanism to attach to the fourth side panel 138. For example, the side tab 150 may be permanently secured to the fourth side panel 138 by a layer of adhesive. In other embodiments, the side tab 150 may be adjacent the fourth side panel 138 at a fold line and attach to the third side panel 136 with a coupling mechanism. In alternative embodiments, however, the third side panel 136 and the fourth side panel 138 may directly abut a fold line while the side tab couples either the third side panel 136 to the second body panel 124 or the fourth side pane 132 to the first body panel 122.

Figure 6:
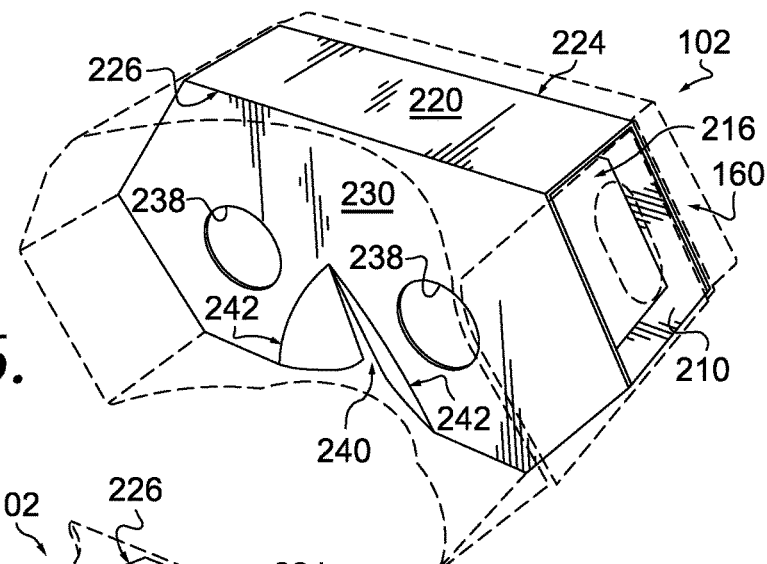
FIG. 6 depicts a front perspective view of the viewing portion of the viewer depicted in FIG. 1 with a body portion removed for clarity.
Figure 7:
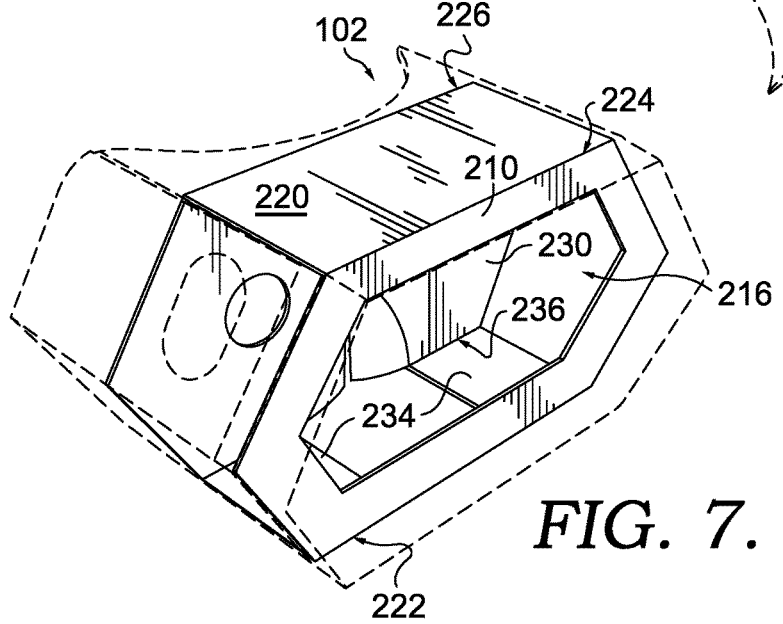
FIG. 7 depicts a rear perspective view of the viewing portion of FIG. 6.

As illustrated in FIG. 1, the first side panel 132 and the second side panel 134 may form a first angle 153 with respect to each other that is equal to a second angle 154 between the third side panel 136 and the fourth side panel 138. The first angle 153 and the second angle 154 may be determined by the shape of the panels of the viewing portion 102 that are positioned within the body portion 104. In the embodiments depicted, for instance, the panels of the viewing portion 102, which are discussed in greater detail with respect to FIGS. 6 and 7, have side walls adjacent to the first side wall 106 and the second side wall 108 of the body portion 104 that each form a viewing panel angle 155. In some embodiments, the first and second angles 153 and 154, respectively, are substantially equal to the viewing panel angle 155 when in an expanded configuration. In some embodiments, the first and second angles 153 and 154, respectively, are each less than 180 degrees. For example, the first and second angles 153 and 154, respectively, may each be approximately 115 degrees. In alternative embodiments, the first and second angles 153 and 154, respectively, may each be 180 degrees when in an expanded configuration such that the first side wall 106 is parallel to the second side wall 108. In these embodiments, the viewing panel angle 155 may also be 180 degrees.

Figure 4:
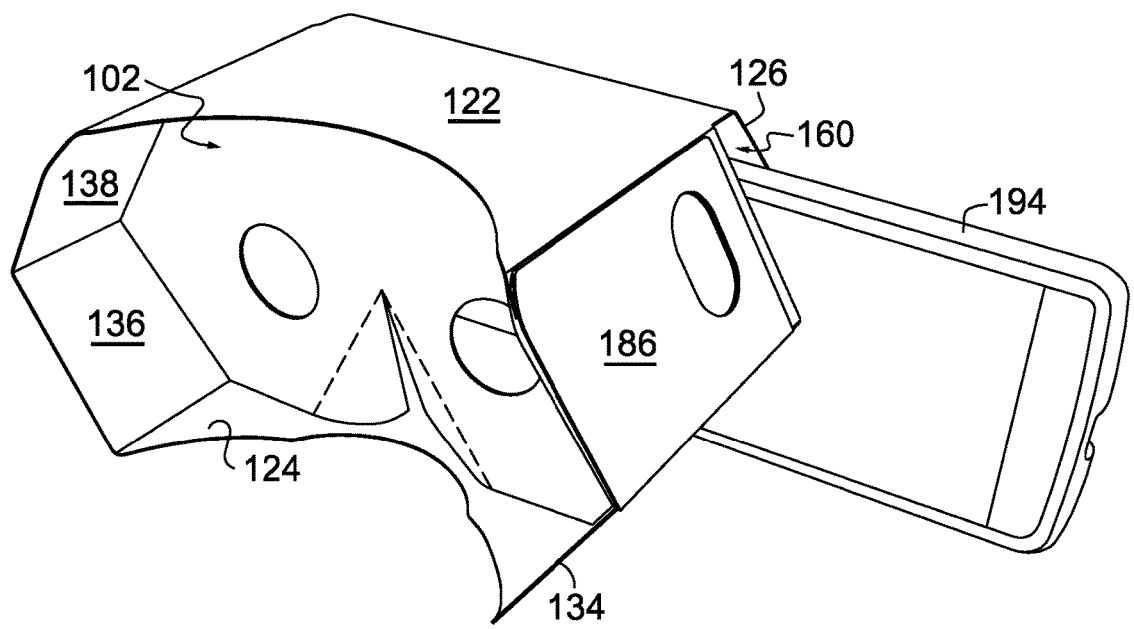
FIG. 4 depicts a front perspective view of the viewer in an expanded configuration depicted in FIG. 1 with a virtual reality display device being inserted into a slot created by the viewer.

In addition to the first and second side walls 106 and 108, respectively, the first body wall 112 and the second body wall 114 may be coupled by a back wall 116 comprising a back panel 126, as shown in FIGS. 2 and 3. The back panel 126 may be adjacent the first body panel 122 at a sixth fold line 156 and adjacent to the third body panel 128 at a seventh fold line 158. The back panel 126 may include a back panel fold line 130 that divides the back panel 126 into a top portion 126a and a bottom portion 126b. When in an expanded configuration, the back panel 126 may be perpendicular to both the first body panel 122 and the third body panel 128 as well as the second body panel 124. As depicted in FIG. 3, the back panel 126 may not be directly abutting the side panels 132, 134, 136, and 138 to provide a slot 160 for receiving a virtual reality display device. As used in this disclosure, a virtual reality display device includes any device having a display screen and capable of displaying a virtual reality display. An exemplary virtual reality display device is a smartphone. To provide for a slot for the virtual reality display device, the first body panel 122 may extend beyond the back edge 162 of the first side panel 132 and the back edge 168 (shown in FIG. 2) of the fourth side panel 138. The second body panel 124, on the other hand, may not extend as far as the first body panel 122 and, therefore, may not completely extend to the back panel 126. Accordingly, the third body panel 128 may bridge the gap between the back panel 126 and the second body panel 124 to form a lower surface for a virtual reality display device received in the slot 160. FIG. 4 depicts a front perspective view of the viewer 100 with a virtual reality display device 194 being inserted into the slot 160 formed by the viewer 100.

Figure 5:
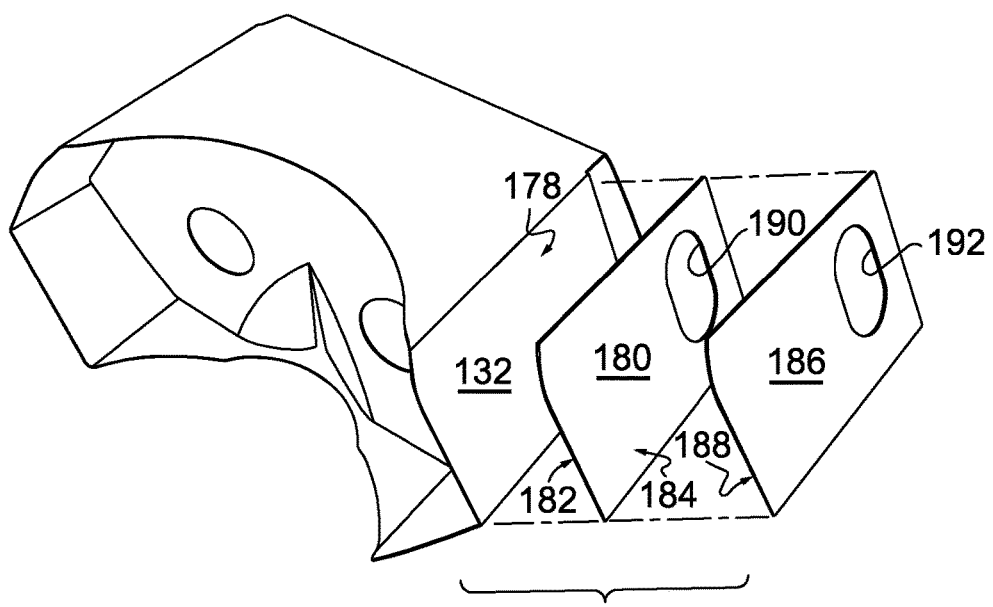
FIG. 5 depicts a front perspective view of the viewer in an expanded configuration depicted in FIG. 1 with side panels shown in an exploded view, in accordance with an aspect of the present invention.

As can be seen in FIGS. 1-4, one or more additional side panels may be positioned over and secured to the first side panel 132. FIG. 5, for example, provides a partially exploded view of the viewer 100 to show a fifth side panel 180 and a sixth side panel 186 layered on top of the first side panel 132. The fifth side panel 180 and the sixth side panel 186 may each have the same general shape as the first side panel 132. When put together, the sixth side panel 186 may overlay and be coupled to the fifth side panel 180, which may overlay and be coupled to the first side panel 132. For example, in some embodiments, an exterior surface 178 of the first side panel 132 may be permanently secured to an interior surface 182 of the fifth side panel 180 with a layer of adhesive while an exterior surface 184 of the fifth side panel 180 may be permanently secured to an interior surface 188 of the sixth side panel 186 with a layer of adhesive. The fifth side panel 180 and the sixth side panel 186 may each include an opening through which a portion of the exterior surface 178 of the first side panel 132 is visible, as shown in FIGS. 1 and 3. For example, the fifth side panel 180 has a first opening 190, and the sixth side panel 186 has a second opening 192. When the sixth side panel 186 is secured to the fifth side panel 180, the first opening 190 may be aligned with the second opening 192. In the embodiment illustrated, the first opening 190 and the second opening 192 each comprises an oval shape, but it is contemplated that the opening may include other shapes, such as a circular shape or polygon shape.

The first and second openings 190 and 192, respectively, may cooperate to form a shallow slot for holding a magnet or another object having magnetic properties, such as a coin or washer. A user may move the magnet on the exterior surface 178 of the first side panel 132 within the confines of the first and second openings 190 and 192, respectively, to interact with a virtual reality display device that is inserted into the slot 160. For example, smartphones having a magnetometer or similar technology may sense the movement of the magnet as if the user is physically touching the display screen of the smartphone. In this way, the user can control the virtual reality display on the virtual reality display device without having direct physical contact with the device. The first and second openings 190 and 192 may be positioned off center of their respective panels so that they are closer to the slot 160 than to the front of the viewer 100. In some embodiments, a magnet is integrated with the viewer 100. In other embodiments, the magnet is a separate piece.

Figure 17:
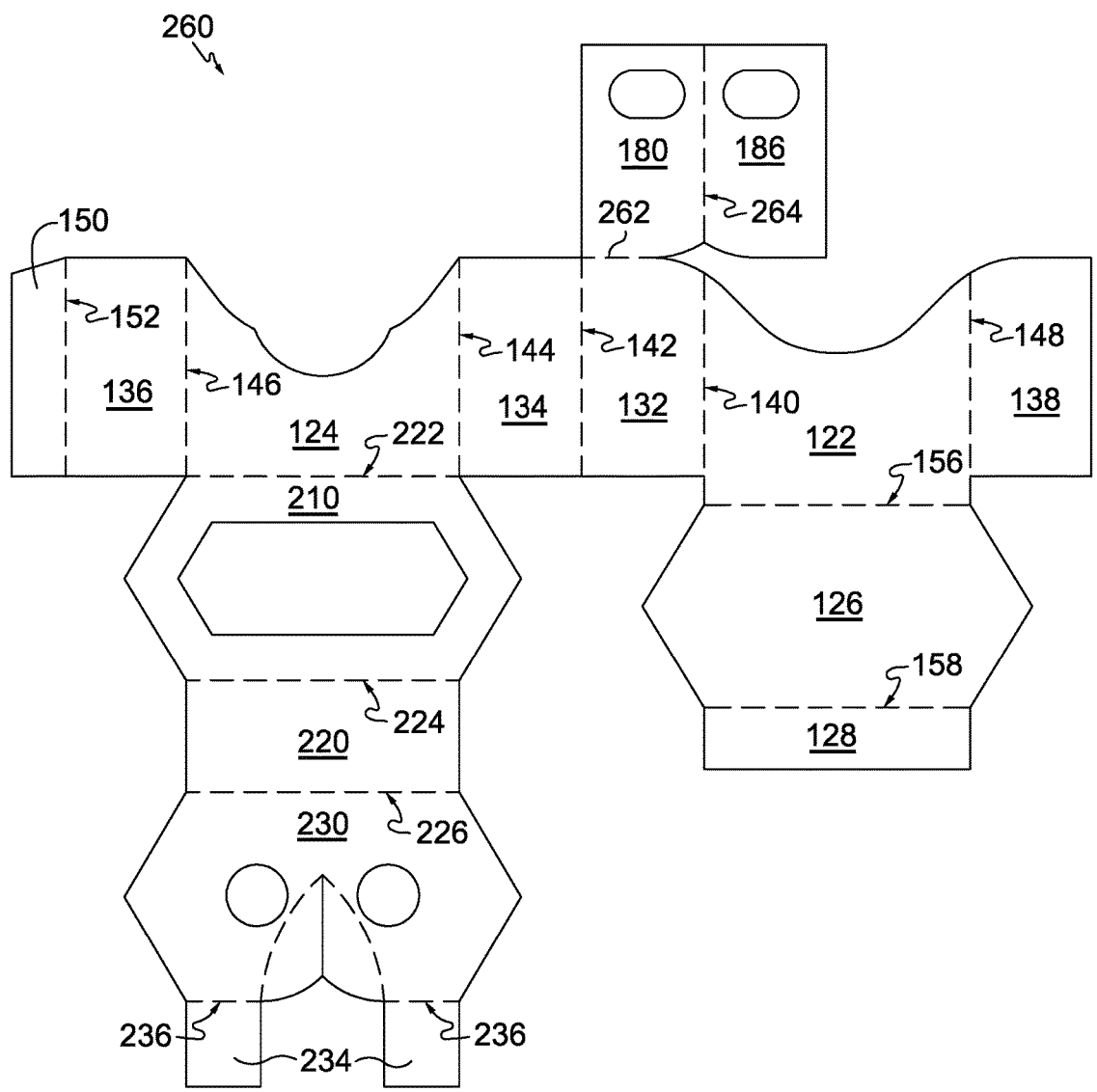
FIG. 17 depicts a top plan view of the viewer depicted in FIG. 1 in an unfolded configuration, as it could be die cut from a single sheet of cardstock.

Though the view of FIG. 5 depicts the fifth side panel 180 and the sixth side panel 186 as discrete panels separate from other panels of the body portion 104, the fifth side panel 180 and the sixth side panel 186 may be formed of the same die-cut blank as the first side panel 132, which is described further with respect to FIG. 17. Additionally, some embodiments may include only the fifth side panel 180 and not the sixth side panel 186.

All together, the walls of the body portion 104 of the viewer 100 cooperate to form and define an inner cavity within which the viewing portion 102 may be at least partially disposed. Front perspective and rear perspective views of the viewing portion 102 with the body portion 104 shown in dashed lines are provided in FIGS. 6 and 7. The viewing portion 102 may include an inner viewing panel 210, an intermediate viewing panel 220, and an outer viewing panel 230. One or more panels of the viewing portion 102 may be coupled to the body portion 104. In exemplary embodiments, for example, the inner viewing panel 210 is coupled to the second body panel 124 at an eighth fold line 222, which is further illustrated in FIGS. 17 and 18, while the outer viewing panel 230 is coupled to the second body panel 124 by one or more viewing panel tabs 234. In the embodiment illustrated, there are two viewing panel tabs 234, each adjacent a bottom edge of the outer viewing panel 230 at a viewing tab fold line 236. In an alternative embodiment, there is a single viewing panel tab 234 extending across the bottom edge of the outer viewing panel 230. The viewing panel tabs 234 may be permanently or releasably coupled to at least a portion of the second body panel 124. In some embodiments, for example, the viewing panel tabs 234 are permanently secured to the second body panel 124 via a layer of adhesive.

When the viewer 100 is in the expanded configuration, the inner viewing panel 210 and the outer viewing panel 230 are substantially parallel to each other as well as substantially parallel to the back panel 126 of the body portion 104. The inner viewing panel 210 may be positioned between the back panel 126 and the outer viewing panel 230. The inner viewing panel 210 cooperates with at least a portion of the first body panel 122, a portion of the third body panel 128 and the back panel 126 to form a slot for the virtual reality display device.

The inner viewing panel 210 and the outer viewing panel 230 may be coupled by the intermediate viewing panel 220. Specifically, the intermediate viewing panel 220 may be adjacent the inner viewing panel 210 at a ninth fold line 224 and adjacent the outer viewing panel 230 at a tenth fold line 226. When the viewer 100 is in a use position or expanded configuration, as illustrated in FIGS. 1-7, the intermediate viewing panel 220 is generally perpendicular to the inner viewing panel 210 and the outer viewing panel 230. Additionally, the intermediate viewing panel 220 is positioned underneath of and is parallel to the first body panel 122 of the body portion 104.

When in the expanded configuration, the viewer 100 is designed to allow a user to see a virtual reality display on a virtual reality display device that has been inserted into the slot 160. As such, the inner viewing panel 210 and the outer viewing panel 230 may include one or more apertures through which a user can see the virtual reality display. For example, the inner viewing panel 210 may include a display aperture 216. The display aperture 216 illustrated is the same shape of the inner viewing panel 210 and extends almost to the edges of the inner viewing panel 210. In this way, the inner viewing panel 210 provides a thin frame around the display aperture 216. The display aperture 216 may be of any desired shape. Some embodiments include a reinforcement panel identical to the inner viewing panel 210. The reinforcement panel may overlay and be secured to the inner viewing panel 210 to increase the strength of the inner viewing panel 210 around the display aperture 216.

Additionally, the outer viewing panel 230 may include one or more viewing apertures 238 that provide a user with a view of the inside of the viewer 100 to see the virtual reality display. For instance, the outer viewing panel 230 may include two circular viewing apertures 238 positioned on the outer viewing panel 230 to align with a user's eyes when the first body panel 122 is positioned against a user's forehead. Accordingly, a user may position the viewer 100 against the user's head so that each eye can see through a viewing aperture 238 in the outer viewing panel 230 and through the display aperture 216 in the inner viewing panel 210 to see a virtual realty display on a virtual reality display device inserted into the slot 160. In some embodiments, the viewer 100 includes a lens in each of the viewing apertures 238.

As the viewer 100 is designed to be used when placed up against a user's face, exemplary embodiments are adapted to fit around the user's face. For example, the front edges of the first body panel 122 and the second body panel 124 may be curved inward to accommodate the curvature of a user's face. Additionally, the outer viewing panel 230 may include a slit 240 running vertically in between the viewing apertures 238 from the bottom edge of the outer viewing panel 230 along a midline of the outer viewing panel 230. The outer viewing panel 230 may also include two curved fold lines 242 running from the top of the slit 240 to the bottom edge of the outer viewing panel 230 on each side of the slit 240. The slit 240 and the two curved fold lines 242 allow the outer viewing panel 203 to slightly open up to accommodate a user's nose when viewing a virtual reality display through the viewing apertures 238.

Figure 8:
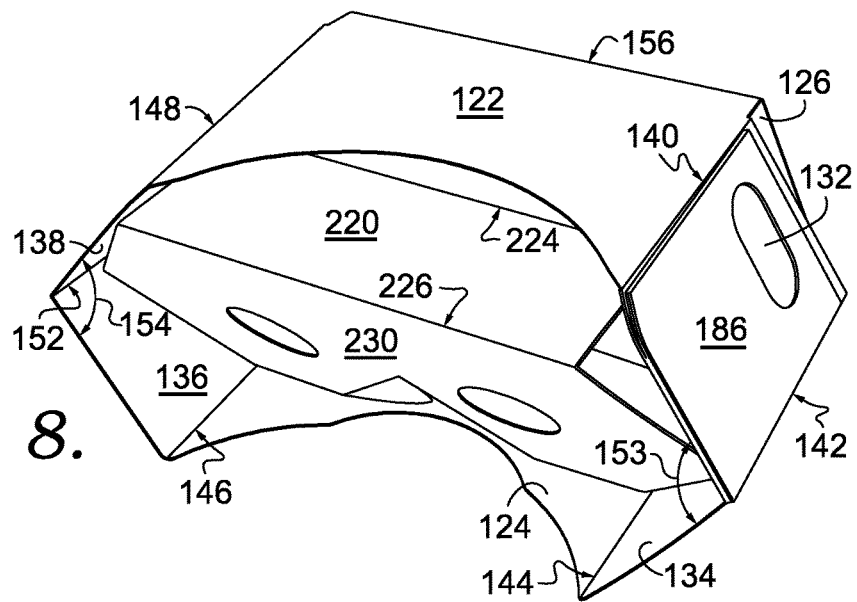
FIG. 8 depicts a front perspective view of the viewer depicted in FIG. 1 in a partially collapsed configuration.
Figure 9:
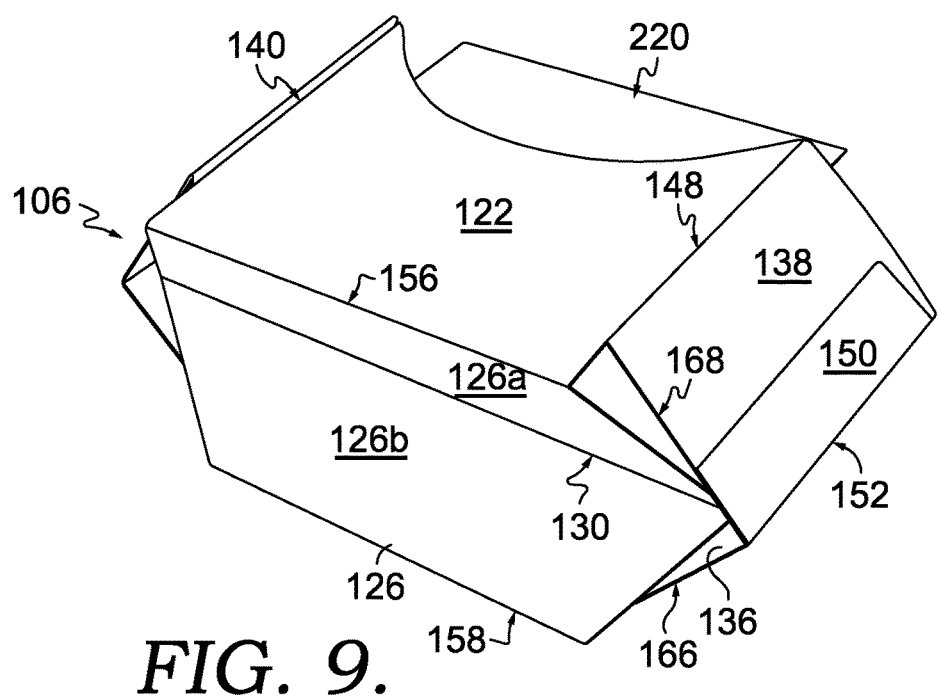
FIG. 9 depicts a rear perspective view of the viewer in the partially collapsed configuration depicted in FIG. 8.
Figure 10:
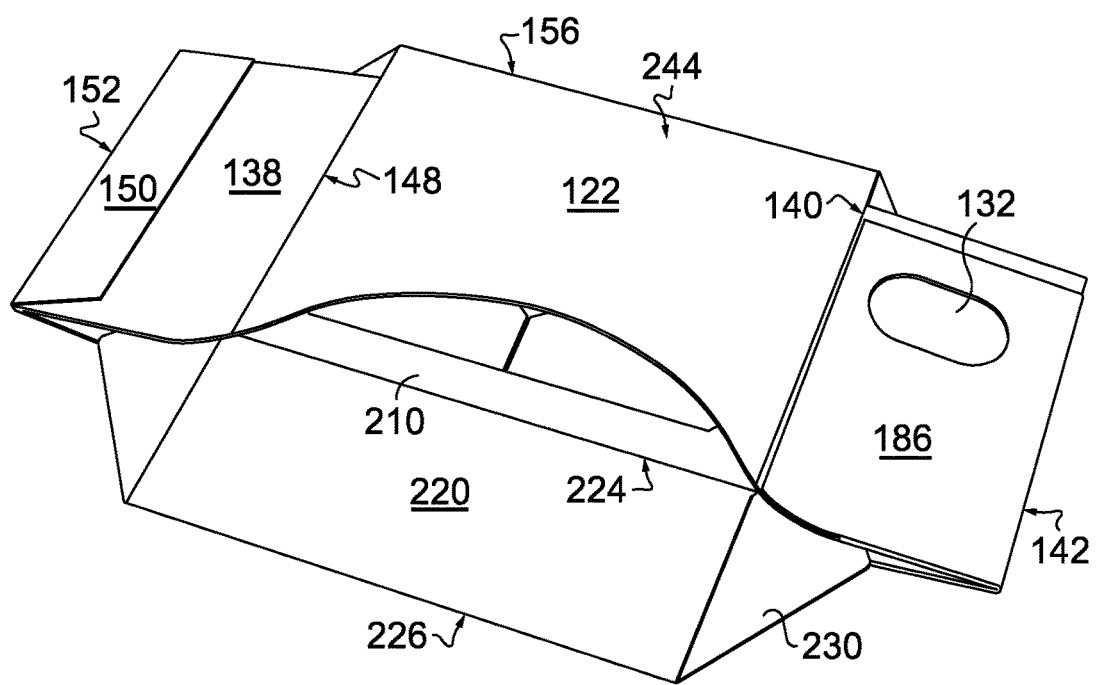
FIG. 10 depicts a top perspective view of the viewer depicted in FIG. 1 in a fully collapsed configuration.
Figure 11:
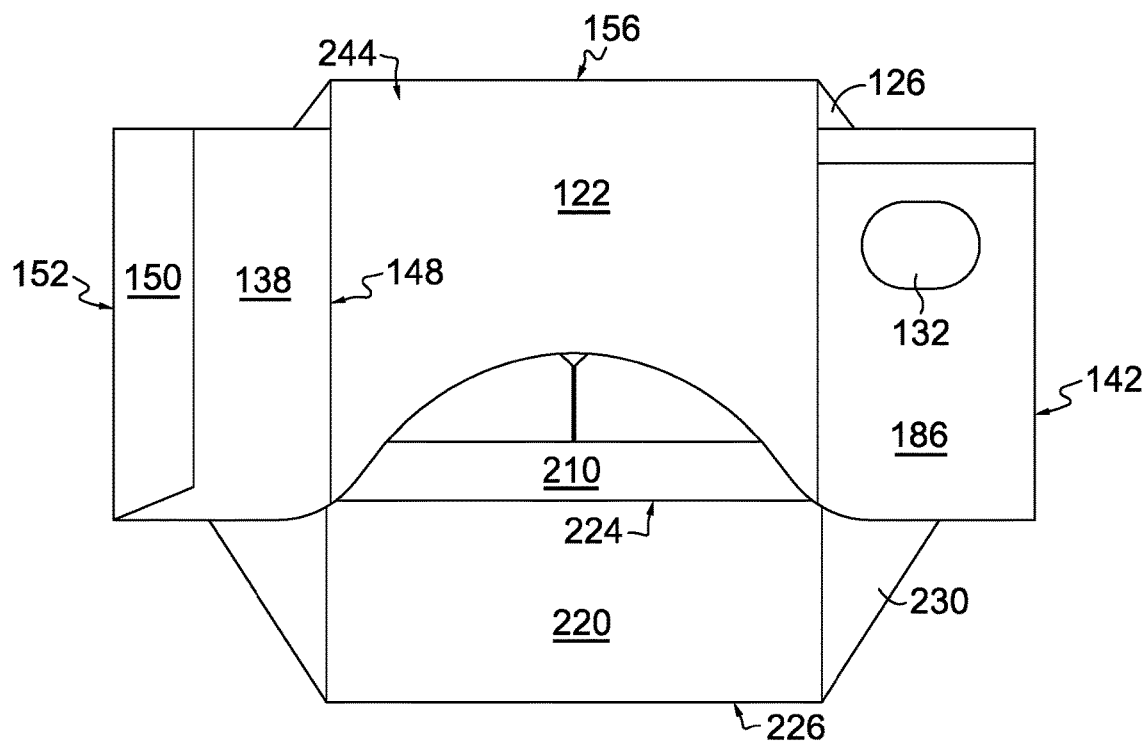
FIG. 11 depicts a top plan of the viewer in a collapsed configuration depicted in FIG. 10.
Figure 12:
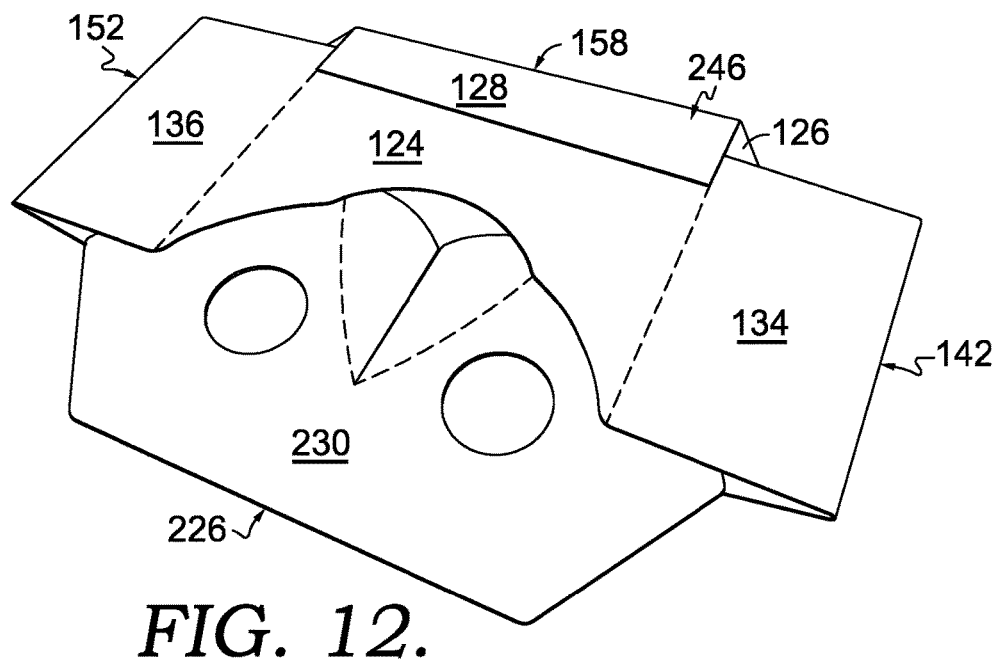
FIG. 12 depicts a bottom perspective view of the viewer in a collapsed configuration depicted in FIG. 11.
Figure 13:
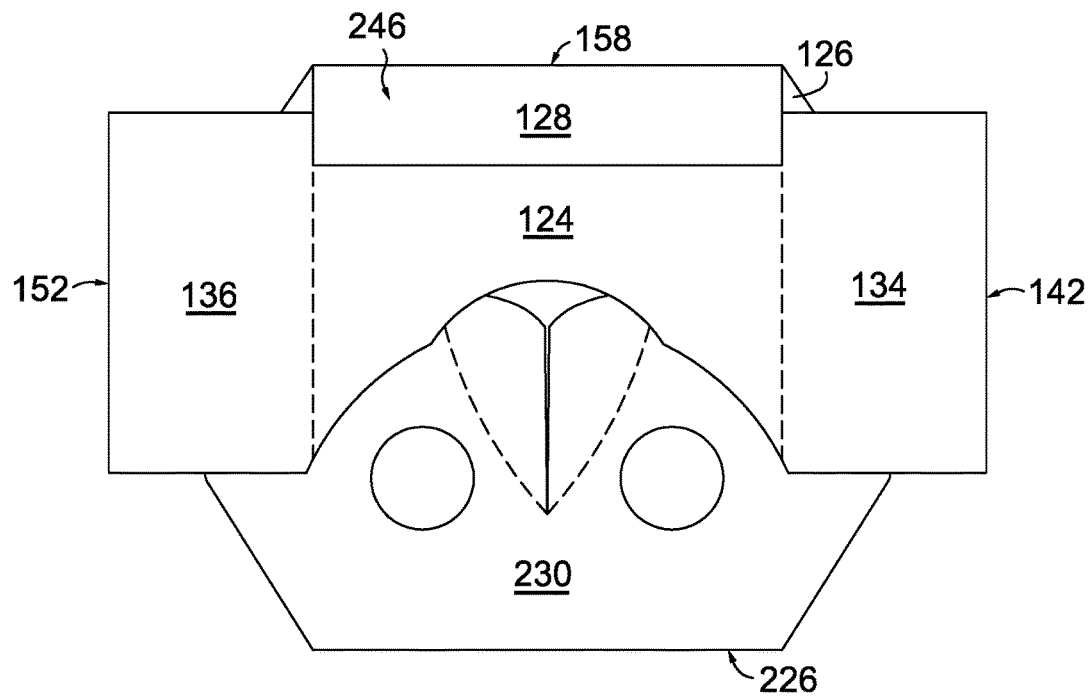
FIG. 13 depicts a bottom plan view of the viewer in a collapsed configuration depicted in FIG. 10.

When not being used in the expanded configuration to view a virtual reality display, a user may fold the viewer 100 into the collapsed configuration. FIGS. 8 and 9 provide a front perspective view and a rear perspective view, respectively, of the viewer 100 in a partially collapsed configuration. As the viewer 100 is moved into the collapsed configuration, the back panel 126 may fold at its back panel fold line 130 such that the top portion 126a of the back panel 126 moves closer to the bottom portion 126b of the back panel 126. The first side panel 132 and the second side panel 134 may fold at the second fold line 142 to move toward each other. Likewise, the third side panel 136 and the fourth side panel 138 with the attached side tab 150 fold at the side tab fold line 152 so that the first side panel 132 moves closer to the fourth side panel 138 and the side tab 150. As the side panels 132, 134, 136, and 138 are folded inwards, the first angle 153 and the second angle 154 decreases. At the same time, the first body panel 122 is moved closer to the second body panel 124 and the third body panel 128.

To allow the body portion 104 to collapse, the viewing portion 102 disposed within the cavity of the body portion 104 also collapses. Specifically, the intermediate viewing panel 220 slides forward to move out from underneath the first body panel 122, allowing the first body panel 122 to be moved closer to the second body panel 124 and the third body panel 128. The intermediate viewing panel 220 folds inward at the tenth fold line 226 towards the outer viewing panel 230 while, at the same time, folds outward at the ninth fold line 224 away from the inner viewing panel 210. Additionally, the inner viewing panel 210 and the second body panel 124 fold towards each other at the eighth fold line 222.

FIGS. 10-13 illustrate various views of the viewer 100 when in a fully collapsed configuration. In this configuration, a top surface 244 of the viewer 100, shown in FIGS. 10 and 11, comprises the sixth panel 186 that is secured to the fifth side panel (not shown) and the first side panel 132, the first body panel 122, and the fourth side panel 138 with the side tab 150 secured to a portion of the fourth side panel 138. The bottom surface 246 of the viewer 100 in a collapsed configuration, shown in FIGS. 12 and 13, comprises the second side panel 134, the second body panel 124 with the third body panel 128 secured to second body panel 124, and the third side panel 136. The back panel 126, which may be folded in half along the back panel fold line 130, and the inner viewing panel 210 may be sandwiched between the first body panel 122 and the second body panel 124. The intermediate viewing panel 220 and at least a portion of the outer viewing panel 230 may be visible and sticking out between the top surface 244 and the bottom surface 246. The viewer 100 may move from the collapsed configuration to an expanded configuration when a user pushes together the second fold line 142 and the side tab fold line 152.

When in the collapsed configuration, the viewer 100 may be relatively flat. For example, when in a fully collapsed configuration, the viewer 100 may have a thickness between the top surface 244 and the bottom surface may be less than one-fourth of an inch in some embodiments. The ability of the viewer 100 to be placed in a collapsed position to have a thin profile may be desirable when using the viewer 100 for promotional purposes. For example, the viewer 100 with promotional material, such as advertisements, may be handed out by businesses or mailed to potential customers.

Figure 14:
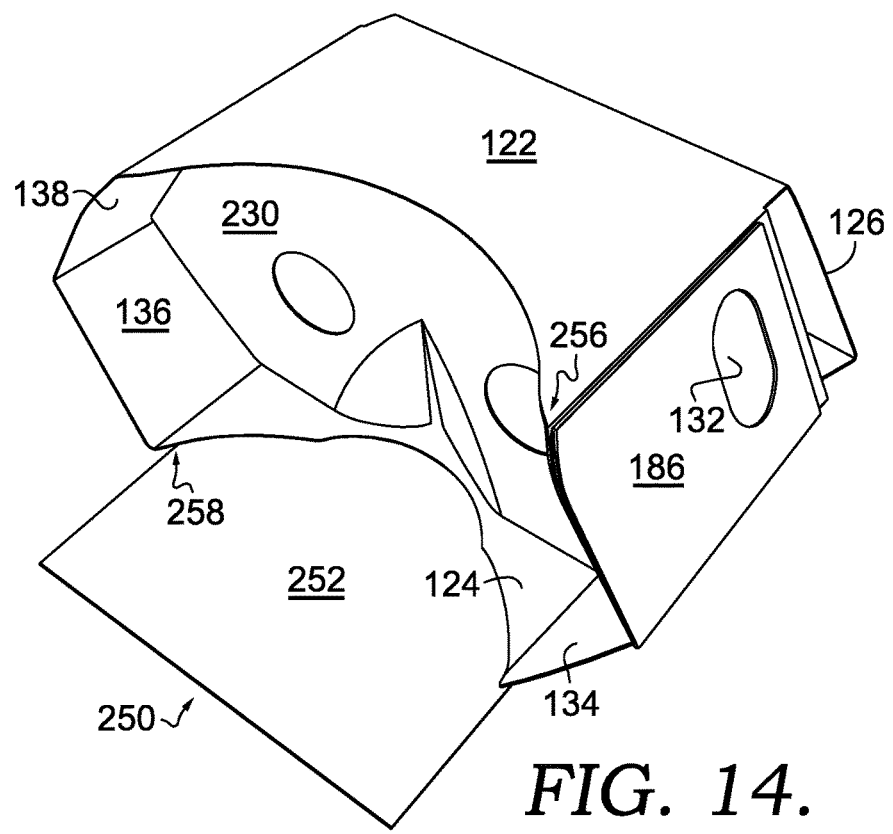
FIG. 14 depicts a front perspective view of a viewer having a detachable portion and in an expanded configuration, in accordance with an alternate embodiment of the present invention.
Figure 15:
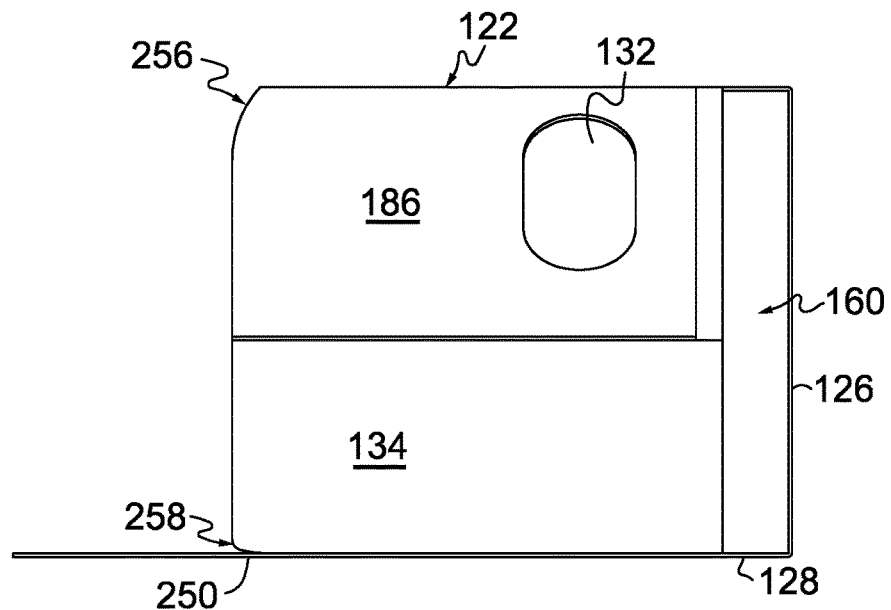
FIG. 15 depicts a side elevation view of the viewer having a detachable portion and in an expanded configuration depicted in FIG. 14.
Figure 16:
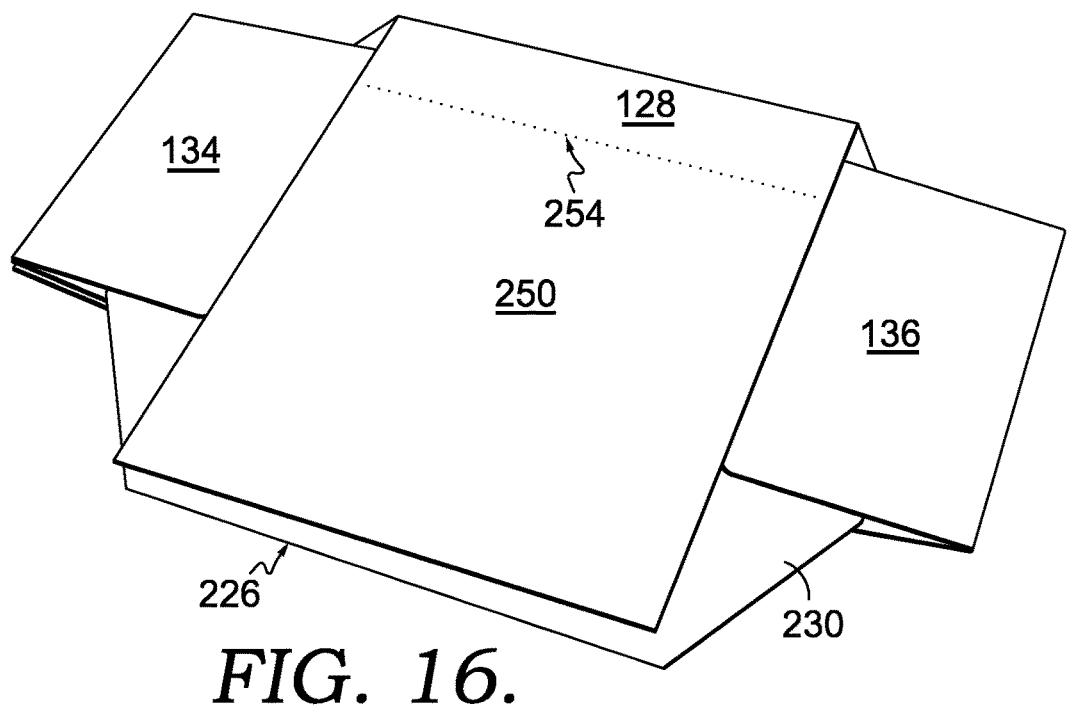
FIG. 16 depicts a bottom perspective view of the viewer having a detachable portion depicted in FIG. 14 in a collapsed configuration.

Embodiments of the viewer 100 with promotional materials are depicted in FIGS. 14-16. In these embodiments, the viewer 100 may include a detachable portion 250. The detachable portion 250 may include a detachable panel 252 coupled to the third body panel 128 at a fold line. In some embodiments, such as the one illustrated in FIG. 16, this fold line is a plurality of perforations 254. The plurality of perforations 254 may be the only mechanism attaching the detachable panel 252 to the rest of the viewer. Accordingly, the detachable panel 252 may be completely detachable from the rest of the viewer 100 along the plurality of perforations 254. The detachable panel 252 may include printed promotional material, such as an advertisement, a coupon, or business information, printed on the detachable panel 252. The detachable panel 252 may also include a mailing address such that the viewer 100 can be used as a mailer. The printed promotional material may be printed directly on the detachable panel 252 or secured to the detachable panel 252, for example, by an adhesive. In some instances, the promotional material is removeably coupled to the detachable panel 252. The detachable panel 252 may also take the appearance of and function as a greeting card. Printed material (e.g., designs, sentiment, etc.) may be printed directly on interior and exterior surfaces (i.e., top and bottom sides) of the detachable panel 252.

Prior to removal, the detachable panel 252 may be positioned underneath the second body panel 124 such that an interior surface of the detachable panel 252 contacts an exterior surface of the second body panel 124. In the embodiment shown, the detachable panel 252 extends past the front edge 256 of the first body panel 122 and the front edge 258 of the second body panel 124. When in the collapsed configuration (FIG. 16), the detachable panel 252 may extend to the tenth fold line 226 between the intermediate viewing panel 220 and the outer viewing panel 230. It is contemplated, however, that the detachable panel 252 may be other sizes and shapes while still achieving the object of the present disclosure. For example, the detachable panel 252, in the illustrated embodiment, has a width dimension approximately equal to width dimensions of the first and second body panels 122, 124. In an alternate embodiment, the detachable panel 252 may have a width dimension approximately equal to a width dimension of the viewer 100 in the collapsed position. In this embodiment the detachable panel 252 would cover most of the second and third side panels 136, 136 in FIG. 16. It should be noted that the detachable panel 252 has the added benefit of covering and protecting any lenses in the viewing apertures 238 during both storage and the mailing process.

Figure 18:
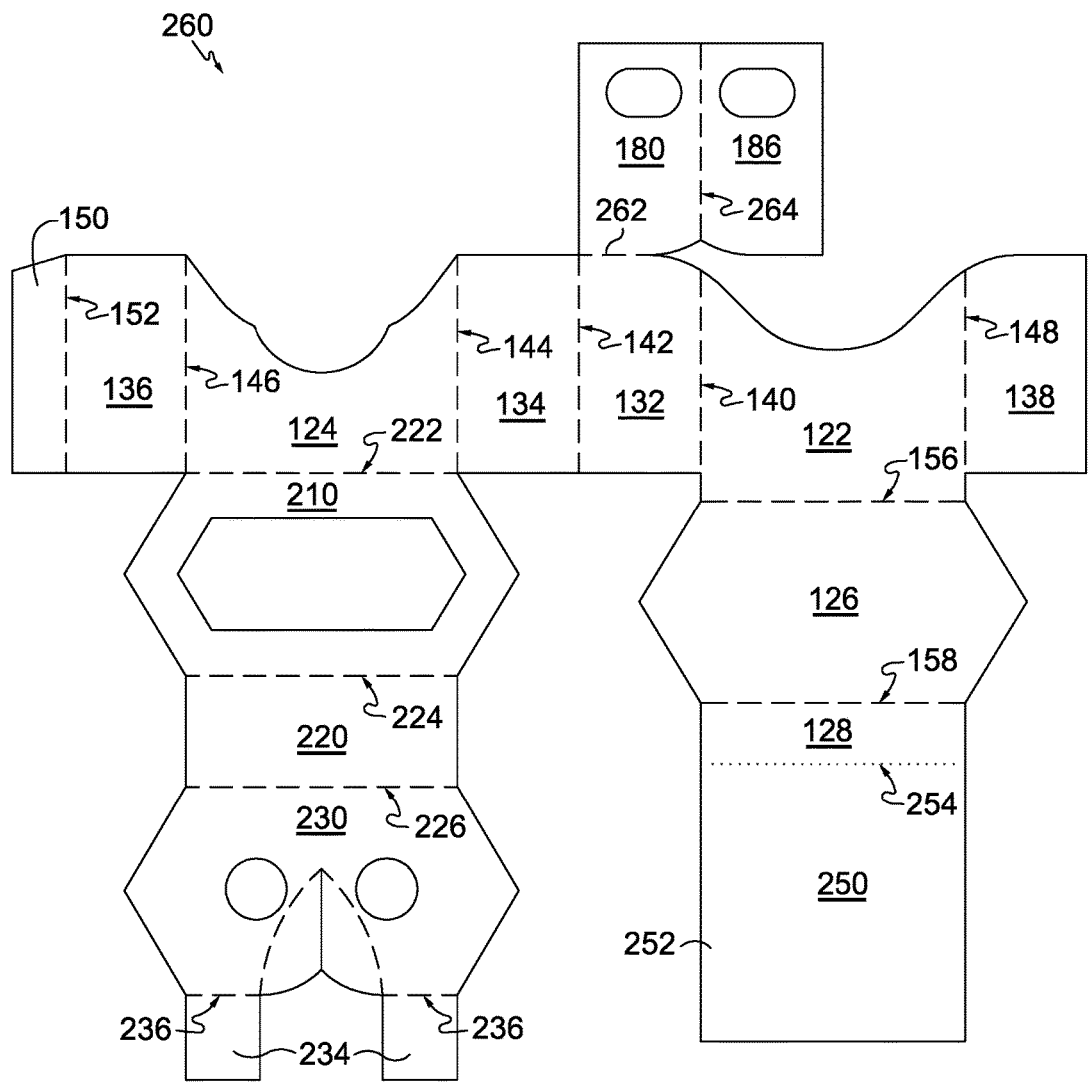
FIG. 18 depicts a top plan view of the viewer having a detachable portion depicted in FIG. 14 in an unfolded configuration, as it could be die cut from a single sheet of cardstock.

As previously mentioned, the viewer 100 may comprise a unitary construction. In other words, the various panels comprising the viewer 100 may be manufactured from a single piece of paper or cardstock. In that regard, FIGS. 17 and 18 illustrate die-cut blanks 260 of cardstock or paperboard material that can be folded along the illustrated fold lines to make the viewer 100. By forming the viewer 100 from a single unitary piece of cardstock, the cardstock may be run through a printer prior to being cut out to print a design, coloring, a pattern, advertisement, or other indicia on one or both sides of the viewer 100.

With reference to FIG. 17, the portions of the blank 260 are identified by the reference characters discussed above with respect to the assembled viewer 100. Starting with the viewing portion 102, the outer viewing panel 230 is folded inward at the tenth fold line 226 towards the interior surface of the intermediate viewing panel 220 while the intermediate viewing panel 220 is folded inward at the ninth fold line 224 towards the interior surface of the inner viewing panel 210. The inner viewing panel 210 is folded inward at the eighth fold line 222 towards the interior surface of the second body panel 124, and the viewing panel tabs 234 on the outer viewing panel 230 are folded inward at their respective viewing tab fold lines 236 to be secured to the interior surface of the second body panel 124.

The panels of the body portion 104 may also be folded inward to enclose the viewing portion 102. The first body panel 122 may fold inward at the first fold line 140 towards the interior surface of the first side panel 132, which may fold inward at the second fold line 142 towards the interior surface of the second side panel 134. The second side panel 134 may fold inward at the third fold line 144 towards the interior surface of the second body panel 124, and the third side panel 136 may fold inward at the fourth fold line 146 towards the interior surface of the second body panel 124. The fourth side panel 138 may fold inwards at the fifth fold line 148 towards the interior surface of the first body panel 122 while the side tab 150 may fold inwards at the side tab fold line 152 towards the interior surface of the third side panel 136. As such, the fourth side panel 138 may be adjacent to the side tab 150 so that the side tab 150 may be secured to the fourth side panel 138. The back panel 126 may be folded inward towards the interior surface of the first body panel 122 at the sixth fold line 156. The third body panel 128 may fold inward at the seventh fold line 158 towards the interior surface of back panel 126. A portion of the third body panel 128 may be secured to the exterior surface of the second body panel 124.

As previously discussed, the viewer may also comprise a fifth side panel 180 and a sixth side panel 186, which may be part of the blank 260 illustrated in FIG. 17. The fifth side panel 180 may be adjacent the first side panel 132 at a fifth side panel fold line 262, and the sixth side panel 186 may be adjacent the fifth side panel 180 at a sixth side panel fold line 264. The fifth side panel 180 may fold at the fifth side panel fold line 262 toward an exterior surface of the first side panel 132. An interior surface of the fifth side panel 180 may be releasably or permanently secured to the exterior surface of the first side panel 132. The sixth side panel 186 may fold at the sixth side panel fold line 264 towards the exterior surface of the fifth side panel 184 and be releasably or permanently secured to the exterior surface of the fifth side panel 180.

FIG. 18 depicts the blank 260 of FIG. 17 with the addition of the detachable portion 250. As such, the various panels discussed with respect to the blank in FIG. 17 apply to FIG. 18, and FIG. 18 further shows the blank 260 having a detachable panel 252 that is removeably coupled to the third body panel 128 along a plurality of perforations 254. When the third body panel 128 is folded at the seventh fold line 158 towards the interior surface of the back panel 126, the detachable panel 252 is also moved with the third body panel 128. Because the detachable panel 252 is part of a single die-cut blank with the other panels, promotional material may be printed one or both sides of the detachable panel 252 at the same time a background, pattern, or other indicia is printed on the other panels of the viewer. Additionally, eliminating the need to assemble promotional material with a separate viewer may decrease the cost of manufacturing the viewer for promotional purposes.

Embodiments of the present invention have been described with the intent to be illustrative rather than restrictive. Alternative embodiments will become apparent to those skilled in the art that do not depart from the scope of the invention. A skilled artisan may develop alternative means of implementing the aforementioned improvements without departing from the scope of the present invention. It will be understood that certain features and subcombinations are of utility and may be employed without reference to other features and subcombinations and are contemplated as within the scope of the claims.

What is claimed is:

1. A collapsible virtual reality viewer comprising:
    a body portion, the body portion comprising:
        a first body wall comprising a first body panel;
        a second body wall opposite the first body wall, the second body wall comprising a second body panel and a third body panel permanently secured to the second body panel;
        a first side wall joining the first body wall and the second body wall, the first side wall comprising a first side panel and a second side panel;
        a second side wall opposite the first side wall and joining the first body wall and the second body wall, the second side wall comprising a third side panel and a fourth side panel; and
        a back wall comprising a back panel permanently secured to the first body panel and the third body panel; and
    a viewing portion coupled to the body portion, the viewing portion comprising:
        an inner viewing panel having a display aperture for viewing a virtual reality display; and
        an outer viewing panel having one or more viewing apertures for viewing the virtual reality display and having one or more viewing panel tabs configured to couple the outer viewing panel to the second body panel,
    wherein the collapsible virtual reality viewer includes a plurality of fold lines and is configured to fold between a collapsed configuration and an expanded configuration,
    wherein, when in the expanded configuration, the viewing portion and the body portion form a slot configured to hold a virtual reality display device.

2. The collapsible virtual reality viewer of claim 1, wherein the plurality of fold lines includes a back panel fold line and the back panel is configured to fold in half at the back panel fold line when moving into the collapsed configuration.

3. The collapsible virtual reality viewer of claim 1, wherein the first side panel is adjacent the first body panel and the second side panel is adjacent the second body panel.

4. The collapsible virtual reality viewer of claim 1, wherein the plurality of fold lines includes a side panel fold line between the first side panel and the second side panel.

5. The collapsible virtual reality viewer of claim 1, wherein the third side panel is adjacent the second body panel and the fourth side panel is adjacent the first body panel.

6. The collapsible virtual reality viewer of claim 1, wherein the fourth side panel is coupled to the third side panel via a side tab.

7. The collapsible virtual reality viewer of claim 6, wherein the plurality of fold lines includes a side tab fold line between the third side panel and the side tab and wherein the side tab is permanently secured to the fourth side panel.

8. The collapsible virtual reality viewer of claim 1, wherein a first angle between the first side panel and the second side panel and a second angle between the third side panel and the fourth side panel are each less than 180 degrees when the collapsible virtual reality viewer is in the expanded configuration.

9. The collapsible virtual reality viewer of claim 1, wherein the first side wall further comprises a fifth side panel having a first opening, the fifth side panel being affixed to and overlaying at least a portion of the first side panel.

10. The collapsible virtual reality viewer of claim 9, wherein the first side wall further comprises a sixth side panel corresponding in shape and size to the fifth side panel and having a second opening, wherein the sixth side panel is affixed to and overlays the fifth side panel such that the first opening is aligned with the second opening.

11. The collapsible virtual reality viewer of claim 1, wherein the viewing portion further comprises an intermediate viewing panel coupling the outer viewing panel and the inner viewing panel.

12. The collapsible virtual reality viewer of claim 1, wherein the plurality of fold lines includes a fold line between the inner viewing panel and the second body panel.

13. The collapsible virtual reality viewer of claim 1, wherein the slot configured to hold the virtual reality display device is formed by at least a portion of the first body panel, at least a portion of the back panel, at least a portion of the third body panel, and at least a portion of the inner viewing panel.

14. A collapsible virtual reality viewer, the collapsible virtual reality viewer comprising:
    a body portion, the body portion comprising:
        a first body wall comprising a first body panel;
        a second body wall opposite the first body wall, the second body wall comprising a second body panel and a third body panel;
        a first side wall joining the first body wall and the second body wall, the first side wall comprising a first side panel and a second side panel;
        a second side wall opposite the first side wall and joining the first body wall and the second body wall, the second side wall comprising a third side panel and a fourth side panel; and
        a back wall coupled to the first body panel and the third body panel;
    a viewing portion coupled to the body portion, the viewing portion comprising:
        an inner viewing panel having a display aperture for viewing a virtual reality display; and
        an outer viewing panel spaced apart from the inner viewing panel and having one or more viewing apertures for viewing the virtual reality display and having one or more viewing panel tabs configured to couple the outer viewing panel to the second body panel; and
    a detachable portion comprising a detachable panel removeably coupled to the third body panel along a plurality of perforations,
    wherein the collapsible virtual reality viewer includes a plurality of fold lines and is configured to fold between a collapsed configuration and an expanded configuration, wherein, when in the expanded configuration, the viewing portion and the body portion form a slot configured to hold a virtual reality display device.

15. The collapsible virtual reality viewer of claim 14, wherein the detachable portion includes promotional material attached to or printed on the detachable panel.

16. The collapsible virtual reality viewer of claim 14, wherein at least a portion of the third body panel is permanently affixed to the second body panel.

17. The collapsible virtual reality viewer of claim 14, wherein when in the collapsed configuration and prior to removal of the detachable panel, an interior surface of the detachable panel contacts an exterior surface of the second body panel.

18. A unitary, collapsible virtual reality viewer, the unitary, collapsible virtual reality viewer comprising:
　a body portion, the body portion comprising:
　　a first body panel;
　　a first side panel adjacent the first body panel, wherein the first side panel and the first body panel abut along a first fold line;
　　a second side panel adjacent to the first side panel, wherein the second side panel and the first side panel abut along a second fold line;
　　a second body panel adjacent to the second side panel, wherein the second body panel and the second side panel abut along a third fold line;
　　a third side panel adjacent to the second body panel, wherein the third side panel and the second body panel abut along a fourth fold line;
　　a fourth side panel adjacent to the first body panel, wherein the fourth side panel and the first body panel abut along a fifth fold line;
　　a side tab configured to couple the third side panel and the fourth side panel;
　　a back panel adjacent to the first body panel, wherein the first body panel and the back panel abut along a sixth fold line; and
　　a third body panel adjacent to the back panel, wherein the third body panel and the back panel abut along a seventh fold line; and
　a viewing portion coupled to the body portion, the viewing portion comprising:
　　an inner viewing panel having a display aperture for viewing a virtual reality display, wherein the inner viewing panel and the second body panel abut along an eighth fold line;
　　an intermediate viewing panel adjacent the inner viewing panel, wherein the intermediate viewing panel and the inner viewing panel abut along a ninth fold line; and
　　an outer viewing panel adjacent the intermediate viewing panel, wherein the outer viewing panel and the intermediate viewing panel abut along a tenth fold line and wherein the outer viewing panel includes one or more viewing apertures for viewing the virtual reality display and includes one or more viewing panel tabs,
　wherein the viewing portion and the body portion are configured to fold along the fold lines to form the unitary, collapsible virtual reality viewer, and
　wherein the panels of the body portion and the panels of the viewing portion are die cut from a single piece of material.

19. The unitary, collapsible virtual reality viewer of claim 18, wherein the single piece of material comprises cardstock.

20. The unitary, collapsible virtual reality viewer of claim 18, wherein the body portion further comprises:
　a fifth side panel having a first opening, the fifth side panel and the first side panel abutting along a fifth side panel fold line; and
　a sixth side panel corresponding in shape and size to the fifth side panel and having a second opening, the sixth side panel and the fifth side panel abutting along a sixth side panel fold line,
　wherein the fifth side panel is configured to overlay at least a portion of the first side panel and the sixth side panel is configured to overlay the fifth side panel such that the first opening aligns with the second opening.

* * * * *